UNITED STATES PATENT OFFICE.

ASAHEL K. EATON, OF NEW YORK, N. Y.

IMPROVEMENT IN INK FOR PRINTING BANK-NOTES, &c.

Specification forming part of Letters Patent No. 38,298, dated April 28, 1863.

*To all whom it may concern:*

Be it known that I, A. K. EATON, of New York, in the county of New York and State of New York, have invented a new and useful application of the chromite of baryta to the purposes of bank-note printing, &c.; and I do hereby declare that the following is a full and exact description thereof.

I have discovered a new and useful mode of protecting bank-notes and other similar work from being copied by photography.

The nature of my invention consists in the use of the chromite of baryta (a new chemical compound discovered by me) in the preparation and application of green ink for plate-printing.

In order that the application and value of my invention may be better understood, I here give the process of manufacturing the chromite of baryta.

Nine and one-fourth parts of bichromate of potash, finely pulverized, are intimately mixed with seven and one-fourth parts of pure sulphate of baryta introduced into a fire-clay crucible or other suitable receptacle and exposed to a temperature gradually increasing until it reaches a white heat. A reaction takes place, resulting in a mutual decomposition of the substances mixed. The sulphuric acid of the sulphate of baryta combines with the potash of the bichromate, forming sulphate of potash. The chromic acid released by this reaction, losing a portion of its oxygen, is immediately reduced to chromous acid, which combines with the baryta, forming chromite of that base. After resulting compound is removed from the crucible it is thoroughly washed to remove the sulphate of potash and then dried. When the strongest color is required it is again ignited. Upon cooling it is ready for use. It is a fine green powder, very difficult to decompose, and hence of great value as a color. This green color, produced as above described, is mixed with oil and applied to the plate in the usual manner. The object to be attained in its use is thorough protection against any attempt to obtain photographic copies of the print. Such copies cannot be obtained so long as any green tint forms a part of the work to be copied. It becomes necessary to remove the green tint before the portion printed in black can be copied successfully; hence the necessity for a color which will resist the action of all reagents, or at least all that would not destroy the whole work. The chromite of baryta is a color of the required character. It cannot be removed from the paper except by agencies that would destroy the paper also or remove the printing in black, together with the green. Alkalies, by their action upon the oil, would remove any tint; but as they would at the same time remove the portion printed in carbon black any attempt to use them would be futile.

The chromite of baryta has this advantage over any other insoluble tint with which I am acquainted, it is less expensive and less injurious in its action upon the plate.

Having thus fully described my invention, what I claim, and desire to secure by Letters Patent of the United States, is—

The use of the chromite of baryta as a tint for the protection of bank-notes and other similar work.

A. K. EATON.

Witnesses:
 G. BREED,
 DANIEL BREED.